Figure 5:
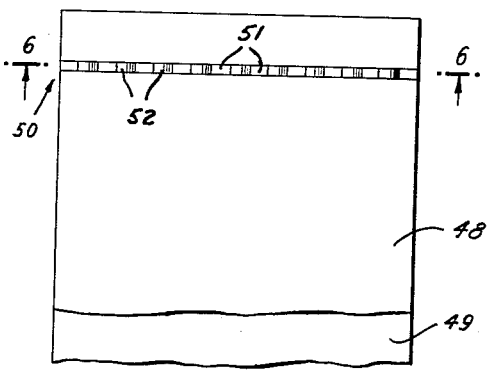

Jan. 2, 1962 — A. FENER — 3,015,601
ART OF HEAT SEALING AND SEVERING THERMOPLASTIC FILMS
Filed Aug. 13, 1959 — 2 Sheets-Sheet 1
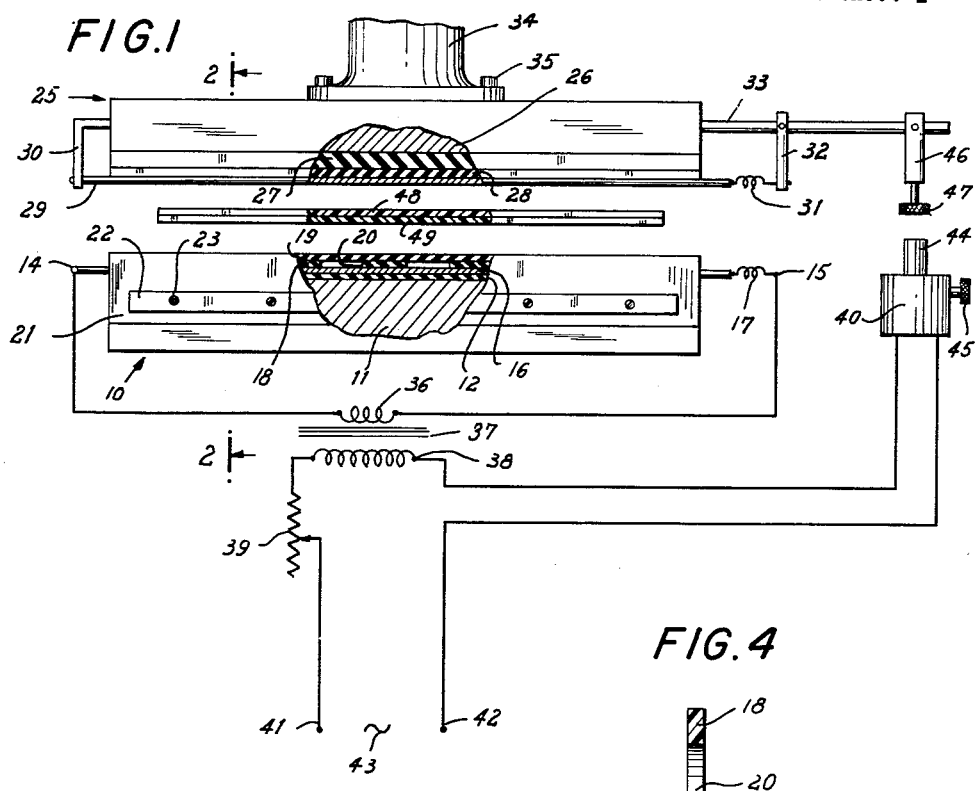
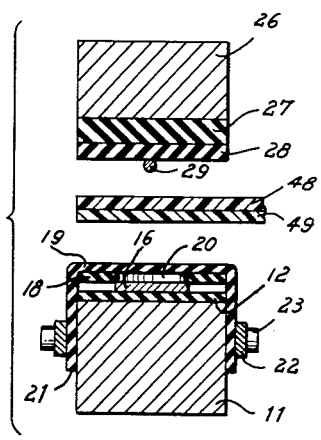
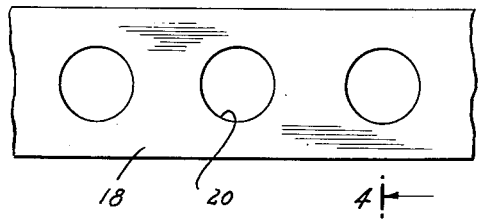
INVENTOR.
ALFRED FENER
BY
Nicholas Fanu
ATTORNEY Jan. 2, 1962  A. FENER  3,015,601
ART OF HEAT SEALING AND SEVERING THERMOPLASTIC FILMS
Filed Aug. 13, 1959  2 Sheets-Sheet 2

INVENTOR.
ALFRED FENER
BY
*Nicholas Jaway*
ATTORNEY

United States Patent Office 3,015,601
Patented Jan. 2, 1962

3,015,601
ART OF HEAT SEALING AND SEVERING THERMOPLASTIC FILMS
Alfred Fener, Brooklyn, N.Y., assignor to Nicholas Langer, New York, N.Y.
Filed Aug. 13, 1959, Ser. No. 833,438
10 Claims. (Cl. 156—515)

This invention relates to the art of heat sealing layers of thermoplastic film and, more particularly, to a novel apparatus and method for heat sealing such layers and severing sealed portions of such layers from each other in a single operation.

In Fener and Langer Patent 2,796,913, there is disclosed and claimed an apparatus and method of heat sealing and severing layers of thermoplastic film in which sealing heat and pressure are applied to the layers in a region of appreciable width to cause heat sealing of the layers in such region, and severing pressure, such as by a cutting wire, is substantially simultaneously applied to the center line of said region, thereby bisecting such region while it is still plastic. Preferably, the application of pressure is continued for a predetermined period after application of the sealing heat has been discontinued to have the sealed and substantially severed portions of the layers cool and consolidate under pressure. The sealing and severing line is continuous and is generally a straight line.

The present invention is directed to an improvement over heat sealing machines and methods of the described character whereby layers of thermoplastic film may be heat sealed or both heat sealed and severed along a discontinuous or interrupted line. Such interrupted sealing and severing lines are useful, for example, in fully automatic packaging machines wherein the bags are formed of a web of thermoplastic film, are filled with predetermined quantities of the goods to be packaged, are heat sealed, and are then separated from each other in a continuous process. In these machines, it is sometimes advantageous to produce only an interrupted, instead of the usual continuous, severing line, so that a chain of connected, but readily separable, filled and sealed packages is formed. This is accomplished by the principles of the present invention.

It is an object of the present invention to improve heat sealing and severing machines of the described character.

It is another object of the present invention to provide a novel heat sealing member for producing a discontinuous or interrupted sealing line.

It is a further object of the invention to provide a novel and improved heat sealing and severing machine adapted to produce a discontinuous or interrupted severing line.

It is also within contemplation of the invention to provide a machine of the thermal impulse type for scoring alternating portions of a heat sealed region of thermoplastic layers to a different extent so that the layers at both sides of said region remain connected but are readily detachable from each other.

The invention also contemplates a method of heat sealing and severing thermoplastic layers in which alternating portions of the sealing regions are heated to different temperatures and are subjected to scoring pressure to score such portions to a different extent.

Figure 6:
Figure 7:
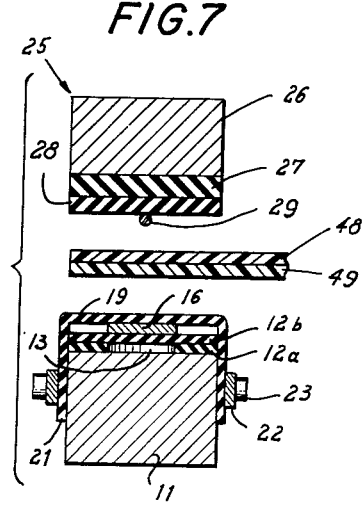

Other and further objects and advantages of the invention will become apparent from the following description and from the accompanying drawing; in which FIG. 1 is a side elevational view, somewhat diagrammatic and fragmentary in character and having parts in section, of a heat sealing and severing machine embodying the principles of the present invention;

FIG. 2 is a section taken on line 2—2 of FIG. 1;
FIG. 3 is a top elevational view of an insulating layer used in the machine shown in FIGS. 1 and 2;
FIG. 4 is a transverse section taken on line 4—4 of FIG. 3;
FIG. 5 is a top elevational view of a pair of thermoplastic layers bonded together and partially severed in a discontinuous linear region by the machine and method of the invention;
FIG. 6 is an enlarged longitudinal sectional view taken on line 6—6 of FIG. 5; and
FIG. 7 is a sectional view similar to FIG. 2, illustrating a modified embodiment of the invention.

In the drawing, the thickness of certain layers has been greatly exaggerated for reasons of clarity.

Broadly stated, in accordance with the principles of the invention, there is provided a sealing bar and a pressure bar, and reciprocating means for said bars for applying pressure upon a pair of layers of thermoplastic film interposed therebetween. The sealing bar or member is preferably of the thermal impulse type and is so designed that, upon its heater element being energized, there are defined in its sealing face alternating portions of higher and lower sealing temperature defining a sealing region. This can be accomplished by tensioning on a suitable base a heater element or sealing band of a metal or alloy having high electrical resistivity, such as a nickel-chromium alloy sold under the name "Nichrome," through which sealing pulses of current may be passed. The sealing band is covered by one or several layers of heat resistant insulation, a thin fabric woven from glass fibers (Fiberglas) and impregnated or coated with tetrafluoroethylene (Teflon) being very satisfactory for the purpose. The layer of insulation is so constructed that spaced portions thereof are of greater thickness than its remaining portions. For example, a row of indentations, or of perforations may be formed in the said layer in a region which is directly overlying the heater element.

The sealing bar just described is arranged for cooperation with a pressure bar, which comprises a metal base, an elastic layer on said base, and a cutting wire tensioned on said base. In the operation of the machine, the superposed layers of thermoplastic film are introduced between the said bar and pressure is applied thereon. A pulse of electric current is passed through the sealing band, heating it practically instantaneously to a relatively high temperature. As a result of the heating effect of the sealing band, the layers of film will be heat sealed together in a region of appreciable width, generally corresponding to the width of the sealing band. It is to be noted that the said region will be heated to relatively higher temperatures where the overlying insulating layer is of lesser thickness, for example due to the presence of indentations or perforations, and will be heated to relatively lower temperatures where the full thickness of the insulating layers cuts down the heat transmission. As at the same time the cutting wire on the pressure bar will be strongly pressed against the sealed region, it will substantially separate or bisect the said region in the portions of relatively high temperature where the said region is soft and highly plastic but will merely score the remaining portions. The result will be a sealing line in which substantially completely severed and merely scored portions alternate with each other, constituting a tearing line along which the two heat sealed layers can be readily separated into two units, each of which is strongly and reliably heat sealed. In accordance with the well known principles of impulse sealing, as disclosed and claimed in Langer Patent 2,460,460, pressure is maintained upon the sealed region for a short period after the pulse of electric current has been discontinued in order to allow the sealed region, or its bisected portions, to cool and to consolidate under pressure whereby the full strength of the seal is developed prior to separating the bars and withdrawing the sealed layers from the apparatus.

In accordance with a modification of the invention, instead of providing, for example by means of a row of perforations, non-uniformity in the heat transmission characteristics of the layer of insulation covering the heater element, such non-uniformity is provided in an underlying layer of insulation which is separating the heater element from the metal base. For example, a row of perforations may be provided in a linear region of the insulation which is directly underlying the heater element. In this case, the heat transmission characteristics of the overlying layer of insulation are uniform, but those of the underlying layer non-uniform, causing non-uniform withdrawal of heat from the heater element into the heat sink constituted by the metal base and thus resulting in the desired non-uniform distribution of heat in the sealing face.

Referring now more particularly to FIGS. 1 and 2 of the drawing, reference numeral 10 generally denotes a sealing bar comprising a base 11 of high heat conductivity metal, such as brass or aluminum, having a thin layer 12 of heat resistant insulation thereon. Upon this layer of insulation, there is tensioned between terminals 14 and 15 a sealing band 16 of Nichrome by interposition of a spring 17. The sealing band is covered by a continuous first layer of heat resistant insulation 18 having a row of perforations 20 therein in a linear region directly overlying the sealing band, upon which there is arranged a second layer of heat resistant insulation 19. The longitudinal marginal portions 21 of layer 19 are folded over the sides of base 11 and are secured thereto by mounting plates 22 and screws 23. Insulating layers 18 and 19 are preferably formed of a Fiberglas fabric impregnated with Teflon in order to prevent their deterioration due to the effect of the sealing heat and to provide a sealing face to which the sealed thermoplastic layers will not adhere or stick.

Sealing bar 10 is mounted for cooperation with a pressure bar 25 comprising a metal base 26 having a layer 27 of a suitable elastomer, such as silicon rubber thereon. Preferably, a thin layer 28 of a heat resistant insulation, such as Teflon-impregnated Fiberglas fabric, is cemented or otherwise secured to elastic layer 27 and constitutes the pressure-applying face of bar 25 in order to improve the resistance of such face to mechanical deformation and also to reduce sticking of the sealed layers thereto. On layer of insulation 28, there is tensioned a cutting wire 29 of steel or Nichrome, one end of which is attached to a bracket 30 depending from one end of base 26, while its other end, through interposition of a spring 31, is attached to a bracket 32 depending from a horizontal bar 33 extending from the other end of said base. The cutting wire has a diameter which is considerably less than the width of sealing band 16 and is desirably arranged to have its longitudinal axis directly above the longitudinal center line of the sealing band when the sealing and pressure bars are in their pressure-applying position. Pressure bar 25 is arranged for relative reciprocation with respect to sealing bar 10, means for carrying out such reciprocation being diagrammatically indicated by a support 34, secured to base 26 of the pressure bar by means of screws 35.

Terminals 14 and 15 of the sealing band are electrically connected with the respective ends of secondary winding 36 of a step-down transformer 37. The ends of primary winding 38 of the said transformer are respectively connected through a rheostat 39 and time delay switch 40 to terminals 41 and 42 of a source of alternating current 43. Time delay switch 40 is of the type which is capable of closing an electric circuit upon its actuating plunger 44 being depressed and to automatically open such circuit a predetermined time delay period thereafter, the length of such time delay period being adjustable by means of adjusting screw 45. As time delay switches of this type are well known to those skilled in the art and do not form part of the present invention, no detailed description of their structure and operation is believed to be necessary.

As described in the foregoing, pressure bar 25 has a horizontally extending rod 33 mounted thereon. From this rod depends an actuating rod 46 in the lower end of which is threaded a screw 47. Screw 47 is so arranged that during downward displacement of the pressure bar, it will strike against actuating plunger 44 of time delay switch 40, thereby initiating the operation of the sealing and cutting cycle. The moment in which said cycle begins is adjustable by means of screw 47, which adjusts the effective length of actuating rod 46.

From the foregoing description, the operation of the machine of the invention will be readily understood by those skilled in the art. When it is desired to operate the machine, layers 48 and 49 of thermoplastic film are introduced between the sealing and pressure bars and the reciprocating means are actuated. During downward displacement of pressure bar 25, screw 47 at the end of actuating rod 46 will strike against actuating plunger 44 of time delay switch 40, thereby completing the primary circuit of transformer 37. Sealing band 16 will be energized and will be practically instantaneously heated to heat sealing temperature, thereby causing heat sealing of the layers in a region of appreciable width. At the same time, cutting wire 29 will be pressed against the center line of the sealed region. Where, due to the presence of perforations 20 directly underneath the sealing face of sealing bar 10, the thermoplastic layers are heated to a relatively high temperature, the said wire will substantially cut through the said layers. Conversely, where such perforations are absent from the linear region directly underlying the sealing face of sealing bar 10, the heat transmission from sealing band 16 will be somewhat impeded and the thermoplastic layers will be heated to a relatively low temperature, so that the said layers will not be severed but merely scored and weakened.

A short period thereafter, time delay switch 40 will automatically break the primary circuit of transformer 37, deenergizing the sealing band so that the seal formed may cool and consolidate under pressure. Finally, allowing sufficient time for the sealed and severed layers to cool and to consolidate, the bars are separated and the finished product is withdrawn. In the sealed region of the product, substantially severed and merely scored portions will alternate with each other, constituting a tearing line along which unit lengths of the thermoplastic layers can be readily separated from each other when desired, while each unit length is strongly and reliably heat sealed. In the operation of fully automatic packaging machines, this makes possible the rapid and efficient production of linked and individually sealed packages which can be conveniently separated into unit packages either at the plant or by the consumer.

Although, as described in the foregoing, cutting wire 29 is unheated, for special applications it is possible and often advantageous to heat said wire, either continuously or cyclically, by the passage of electric current therethrough, as this is disclosed and claimed in Fener and Langer Patent 2,796,913.

Considerable variations are possible as to the dimensions of the sealing band and of the cutting wire in accordance with the particular application. In most cases, however, the sealing band will have a width between $1/16''$ and $1/4''$ and its thickness will be between $0.001''$ and $0.01''$. The cutting wire may have a diameter between $0.015''$ and $0.040''$. Preferably both elements are formed of Nichrome. Insulating layers 12, 18 and 19 may be formed of Teflon-impregnated Fiberglas fabric having a thickness between $0.003''$ and $0.010''$. Perforations 20 in insulating layer 18 may be of any desired shape, uniformly spaced circular perforations having a diameter between 1/16" and 1/4" being quite satisfactory for the purpose. In general, the diameter of the said perforations should be as great or greater than the width of the sealing band with which the insulating layer is used. The spacing of the perforations, of course, depends on the desired proportion of the severed and scored portions in the sealing line. In FIGS. 1 and 2 of the drawing two insulating layers, 18 and 19 are shown above sealing band 16, of which layers the lower one, 18, is provided with a row of perforations, 20. It is equally possible, however, to incorporate the said perforations into the upper one of the said layers.

FIG. 5 is a top elevational view of the pair of thermoplastic layers 48 and 49 after they have been bonded together in a sealing line 50, comprising substantially severed regions 51 and scored regions 52. As it will be observed in the sectional view represented by FIG. 6, in which the thickness of the layers has been greatly exaggerated for reasons of clarity, regions 51 of the layers have been substantially severed by the extruding effect of the cutting wire, while regions 52 have been merely scored to an extent determined by the operating conditions of the apparatus. The alternating severed and scored regions constitute a tearing line which is of sufficient strength to hold the corresponding unit lengths of the layers together but permits ready separation of such lengths from each other, when desired. Each of said unit lengths is strongly and positively heat sealed at the line of separation.

FIG. 7 is a view similar to FIG. 2, of a modified embodiment of the invention in which the heat transmission characteristics of the layer of insulation overlying the heater element are uniform but those of the layer or layers of insulation underlying the heater element are non-uniform. Similar reference numerals have been used to denote corresponding parts. Reference numeral 10 generally denotes the sealing bar comprising a base 11 of high heat conductivity metal having a thin layer 12a of heat resistant insulation thereon in which there is provided a row of perforations 13. A second, imperforate layer 12b of heat resistant insulation is arranged over layer 12a. Upon the said second layer of insulation 12b, there is tensioned a heater element or sealing band 16 of Nichrome in a linear region directly overlying perforations 13 in layer 12a. The sealing band is covered by a continuous layer of heat resistant insulation 19, the center portion of which constitutes the sealing face of bar 10, while its lateral marginal portions 21 are folded over the sides of base 11 and are secured thereto by mounting plates 22 and screws 23. As the structure of pressure bar 25 is identical with that shown in FIGS. 1 and 2, it does not require any further description.

In view of the close similarity of construction, the operation of this modified embodiment of the invention will be readily understood by those skilled in the art without any detailed description. It will be sufficient to state that upon heater element 16 being energized by a pulse of electric current passed therethrough, the withdrawal of heat from said element into the heat sink constituted by base 11 will be non-uniform, due to the presence of perforations 13 in insulating layer 12a interposed between heater element and base. The result will be non-uniform distribution of sealing heat in the center region of sealing face 19 directly overlying the heater element. Thus, linear portions of higher and lower sealing temperature will alternate in the sealing face so that, same as in the apparatus of FIGS. 1 and 2, upon co-operation of sealing bar 10 and pressure bar 25, layers of thermoplastic film 48 and 49 will be sealed together in a line in which substantially completely severed and merely scored portions will alternate with each other.

Although the present invention has been described in connection with a preferred embodiment thereof, variations and modifications may be resorted to by those skilled in the art without departing from the principles of the invention. All of these variations and modifications are considered to be within the true spirit and scope of the present invention, as disclosed in the foregoing description and defined by the appended claims.

I claim:

1. A sealing member for heat sealing machines comprising, in combination, a base, an elongated heater element in the form of a metal band on said base adapted to be heated to uniform sealing temperature throughout its length by the passage of current therethrough, and a layer of insulation covering said metal band and constituting the operative sealing face of the member, said layer having a row of perforations in its linear region which is directly overlying said metal band, the diameter of said perforations being at least equal to the width of said metal band.

2. A sealing member for heat sealing machines comprising, in combination, a metal base, a layer of insulation on said base, an elongated heater element in the form of a metal band tensioned on said base adapted to be heated to uniform sealing temperature throughout its length by the passage of current therethrough, and a pair of layers of heat resistant insulation covering said metal band of which the outer one constitutes the operative sealing face of the member, one of said pair of layers having a row of perforations in its linear region which is directly overlying said metal band, the diameter of said perforations being at least equal to the width of said metal band.

3. A sealing member for heat sealing machines of the thermal impulse comprising, in combination, a base of metal of high heat conductivity, a layer of heat resistant insulation on said base, a ribbon of metal of high specific resistivity tensioned on said layer of insulation adapted to be heated to uniform sealing temperature throughout its length by the passage of current therethrough, and a pair of layers of heat resistant insulation covering said ribbon, the outer one of said pair of layers constituting the operative and sealing face of the member and having a row of perforations in its linear region directly overlying said ribbon, said perforations having a diameter at least equal to the width of said ribbon whereby upon passage of current through said ribbon portions of higher and lower temperature will alternate with each other in said linear region of the sealing face.

4. A heat sealing machine comprising, in combination, a sealing member and a pressure member; said sealing member comprising a base, an elongated heater element on said base adapted to be heated to uniform sealing temperature throughout its length by the passage of current therethrough, and a layer of insulation covering said heater element having a row of perforations in its linear region which is directly overlying said heater element whereby portions of lower heat conductivity alternate with portions of higher heat conductivity in said region; said pressure member comprising a base and an elongated cutting member on said base directly above said heater element whereby upon compression of layers of thermoplastic film between said sealing and pressure members and upon energizing of said heater element said layers of film will be heat sealed and at least partially severed in an interrupted linear region.

5. A heat sealing machine of the thermal impulse type comprising, in combination, a sealing member and a pressure member mounted for reciprocation with respect to each other, said sealing member comprising a base, an elongated heater element tensioned on said base adapted to be heated to uniform sealing temperature throughout its length upon passing a pulse of current therethrough, and at least one layer of insulation covering said heater element, said layer of insulation having a row of perforations in its linear region which is directly overlying said heater element whereby portions of lower heat conductivity alternate with portions of higher heat conductivity in said region; said pressure member comprising a base, and a cutting wire tensioned on said base substantially above the longitudinal center line of said heater element; means for reciprocating said members to apply pressure upon layers of thermoplastic film interposed therebetween; and switching means operable in timed relation with said reciprocating means for passing a pulse of current through said heater element whereby said layers will be sealed together in said linear region by the heating effect of said heater element and the sealed region will be scored by the pressure of said wire thereagainst, said scoring being more pronounced above the portions of lesser thickness than over the portions of greater thickness in said layer of insulation.

6. A heat sealing machine of the thermal impulse type comprising, in combination, a sealing bar and a pressure bar mounted for cooperation with each other, said sealing bar comprising a base, a metal sealing band tensioned on said base adapted to be heated to uniform sealing temperature throughout its length upon passing a pulse of current therethrough, and at least one layer of heat-resistant insulation covering said band and having a row of perforations therein in its linear region overlying said band, said perforations having a diameter at least equal to the width of said band thereby providing alternating areas of lower and higher heat conductivity in said region; said pressure bar comprising a base, and a cutting wire tensioned on said base substantially above the longitudinal center line of said sealing band; means for displacing said bars toward one another to apply pressure upon layers of thermoplastic material interposed therebetween; and switching means operable in timed relation with said displacing means for passing a pulse of current through said sealing band whereby said layers will be sealed together in said linear region by the heating effect of said sealing band and the sealed region will be respectively scored and bisected in the areas over said areas of lower and higher heat conductivity in said layer of insulation by the pressure of said wire against said region.

7. A heat sealing machine of the thermal impulse type comprising, in combination, a sealing bar and a pressure bar mounted for reciprocation with respect to each other, said sealing bar comprising a base, a metal sealing band tensioned on said base adapted to be heated to uniform sealing temperature throughout its length upon passing a pulse of current therethrough, and a pair of layers of heat-resistant insulation covering said band, one of said layers having a row of perforations in its linear region overlying said band thereby providing alternating areas of lower and higher heat conductivity in said region; said pressure bar comprising a base, an elastic layer on said base, and a cutting wire tensioned on said elastic layer substantially above the longitudinal center line of said sealing band and having a diameter substantially smaller than the width of said band; means for reciprocating said bars to apply pressure upon layers of thermoplastic material interposed therebetween; and switching means operable in timed relation with said displacing means for passing a pulse of current through said sealing band whereby said layers will be sealed together in said linear region by the heating effect of said sealing band and the sealed region will be respectively scored and substantially bisected in the areas over said areas of lower and higher heat conductivity in said layer of insulation by the pressure of said wire against said region.

8. A sealing member for heat sealing machines comprising, in combination, a metal base, at least one layer of insulation on said base, an elongated heater element in the form of a metal band tensioned on said base adapted to be heated to uniform sealing temperature throughout its length by the passage of current therethrough, and at least one layer of insulation covering said metal band, at least one of the several layers of insulation having a row of perforations in its linear region which is directly aligned with said metal band, said perforations having a diameter at least equal to the width of said metal band.

9. A sealing member for heat sealing machines of the thermal impulse type comprising, in combination, a base of metal of high heat conductivity, a pair of layers of heat resistant insulation on said base, a ribbon of metal of high specific resistivity tensioned on said layer of insulation adapted to be heated to uniform sealing temperature throughout its length by the passage of current therethrough, and a layer of heat resistant insulation covering said ribbon and constituting the sealing face of said member, one of said pair of layers of insulation having a row of perforations in its linear region directly underlying said ribbon, the diameter of said perforations being at least equal to the width of said ribbon whereby upon passage of current through said ribbon different amounts of heat will be withdrawn into said base from different linear portions of the ribbon causing the production of alternating portions of higher and lower temperature in the corresponding linear region of said sealing face.

10. A heat sealing machine comprising, in combination, a sealing member and a pressure member; said sealing member comprising a metal base, a pair of layers of insulation on said base, an elongated heater element on said layers of insulation adapted to be heated to uniform sealing temperature throughout its length by the passage of current therethrough, and a layer of insulation covering said heater element, one of said pair of layers of insulation having a row of perforations in its linear region which is directly underlying said heater element whereby portions of lower heat conductivity alternate with portions of higher heat conductivity in said region; said pressure member comprising a base, and an elongated cutting member on said base directly above said heater element whereby upon compression of layers of thermoplastic film between said sealing and pressure members and upon energizing of said heater element said layers of film will be heat sealed and at least partially severed in an interrupted linear region.

References Cited in the file of this patent

UNITED STATES PATENTS

| | | |
|---|---|---|
| 2,796,913 | Fener | June 25, 1957 |
| 2,802,086 | Fener | Aug. 6, 1957 |
| 2,916,594 | Sawyer | Dec. 8, 1959 |

FOREIGN PATENTS

| | | |
|---|---|---|
| 119,540 | Australia | Feb. 6, 1945 |